May 29, 1962 R. N. MELLOTT 3,037,200

COMPUTER MAGNETIC DRUM WRITING CIRCUITS

Filed June 23, 1958 2 Sheets-Sheet 1

ROBERT N. MELLOTT
INVENTOR.

BY

ATTORNEY

COMPUTER MAGNETIC DRUM WRITING CIRCUITS

Filed June 23, 1958 2 Sheets-Sheet 2

ROBERT N. MELLOTT
INVENTOR.

BY [signature]
ATTORNEY

United States Patent Office 3,037,200

Patented May 29, 1962

3,037,200

COMPUTER MAGNETIC DRUM WRITING CIRCUITS

Robert N. Mellott, Los Angeles, Calif., assignor, by mesne assignments, to Thompson Ramo Wooldridge Inc., Cleveland, Ohio, a corporation of Ohio Filed June 23, 1958, Ser. No. 743,891

3 Claims. (Cl. 340—174.1)

This invention relates to computer magnetic drum writing circuits, and more particularly, to a digitally controlled amplifier system wherein current is supplied in one of two directions to a load such as a magnetic recording head, depending upon the representation of a digital input signal.

In a conventional practice of the prior art, tandem operation of a pair of amplifiers in driving a load connected at the secondary of an output transformer is accomplished by employing a first amplifier to drive one-half of the center-tapped primary of the output transformer in response to positive excursions of the input signal and a second amplifier to drive the other half of the output primary in response to negative excursions of the input signal. The input circuit of the amplifiers may include the center-tapped secondary winding of an input transformer. Since current passes through the primary of the output transformer in opposite directions depending upon which amplifier is operative to pass current, the secondary winding thereof is continuously energized to provide an output signal which, in essence, is a replica of the input signal.

While this arrangement is satisfactory for many applications, it has several disadvantages when considered in connection with digital computer applications. The voltage which is developed across the entire primary winding of the output transformer is twice that developed across half thereof due to the well-known auto-transformer action. Thus, the full voltage which appears across a non-conducting amplifier may approach twice the voltage which appears across a conducting amplifier. As a result, voltages impressed on an amplifier when drawing current must be established at at most half of the maximum rated voltage. In the case of amplifiers which utilize transistors, this limitation may result in a considerable reduction in the power output capability of an otherwise well-designed circuit. The reason for thiss is that the power obtainable from the circuit is proportional to $I(V/2)$ where I is the current rating for the transistor and V is its voltage rating. In other words, the maximum power capability of the circuit is reduced to one-half of what would be possible if the amplifiers could be operated at their maximum voltage.

Another disadvantage of the conventional circuit, especially with regard to digital computer work, is the requirement of an output transformer with an accurately center-tapped primary, an electronic component usually of special design. Where the circuit is used as a writing circuit to energize a magnetic head, this may mean a substantial increase in cost of circuit components, since there are many heads and a writing circuit is generally specified for each. If the output transformer were not required to be center-tapped, the magnetic head could be driven directly by the circuit, as is accomplished according to the present invention.

Accuracy of the center tap is a requirement in this application of the circuit since any unbalance may introduce spurious signals into the head and these may be recorded on the drum.

The present invention obviates the above disadvantages by providing a tandem amplifier system wherein four amplifiers are employed to control the energization of the load by the circuit in response to bivalued input signals. Two of the amplifiers are arranged to pass current through the load in one direction in response to one value of input signal and the other two amplifiers are arranged to pass current in the opposite direction through the load in response to the other value of input signal.

In one form of the invention the amplifiers are NPN transistors. A first pair of transistors are connected with the collector of one transistor coupled to one end of the load and the emitter of the other transistor coupled to the other end of the load to pass current in the forward bias direction of the transistors. The second pair of transistors then are arranged in a similar manner but are coupled to opposite ends of the load so as to pass current in the reverse direction. That is, if the transistors are designated as first, second, third and fourth, the first and fourth transistors may be considered to be the first pair and the second and third transistors the second pair. Then the collector electrodes of the first and second transistors are coupled to opposite ends of the load and are coupled to the emitter electrodes of the third and fourth transistors, respectively.

In the complete circuit arrangement of transistors described above, a source of current is provided and coupled between the junction of the emitters of said first and second transistors and the junction of the collectors of said third and fourth transistors. The transistors are then driven so that either said first and fourth transistors are driven into conduction passing current to the load in one direction or so that said second and third transistors are conducting passing current to the load in the opposite direction. While various means may be employed for driving the transistors, the presently preferred practice of the invention contemplates utilizing an input transformer having a four-section secondary winding, each section being associated with a different one of the transistors for biasing it in the proper direction for current flow as discussed above.

Accordingly, it is an object of the present invention to provide an improved driving circuit for a load which is capable of passing current in either of two directions through the load in response to a digital input signal.

Another object of the invention is to provide an improved digitally controlled amplifier system which does not require the center-tap transformer of the prior art.

A further object is to provide a four amplifier switching or gating arrangement for driving a load permitting the passage of current in either direction through the load in response to the sense or phase of an applied input signal.

Another object of the invention is to provide a simple, inexpensive load driving circuit which is especially useful in digital computer systems.

A specific object of the invention is to provide an improved writing circuit for a magnetic head which does not require either a center-tapped head or a center-tapped output transformer.

Another specific object of the invention is to provide an amplifier system of increased power capability.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 1:
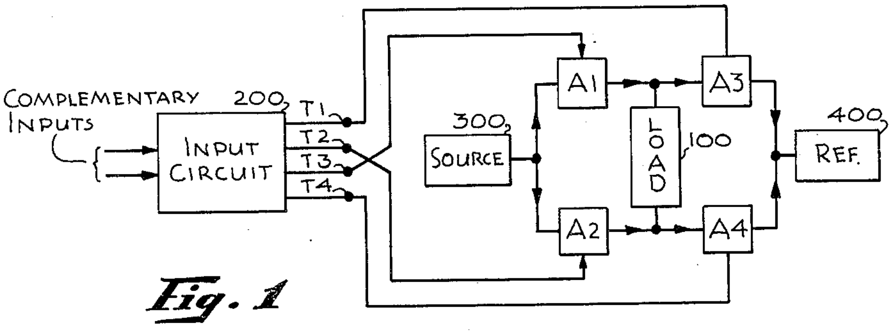
FIG. 1 is a block diagram illustrating the general form of the invention.

Reference is now made to FIG. 1 where it will be noted that four amplifiers designated as A1, A2, A3 and A4 are arranged to drive a load 100. These amplifiers receive control signals from an input circuit 200 having output terminals T1, T2, T3 and T4. The signals produced by circuit 200 are such that the polarity at terminals T1 and T2 is the same and the polarity at terminals T3 and T4 is the same and whenever terminals T1 and T2 provide positive signals, terminals T3 and T4 provide negative signals. Further, terminals T1 and T2 are out of phase with the input signal, while terminals T3 and T4 are in phase with the input signal.

Presuming that each amplifier conducts in response to a negative input signal and is cut off in response to a positive input signal, it is seen that, when terminals T1 and T2 are negative and terminals T3 and T4 are positive, amplifiers A2 and A3 will conduct and amplifiers A1 and A4 are cut off. For this condition, current will flow from source 300 through load 100 to reference 400. Conversely, when the opposite polarity prevails at terminals T1, T2, T3 and T4, amplifiers A2 and A3 will be cut off and amplifiers A1 and A4 will conduct. For this condition, current will flow from source 300 through load 100 to reference 400 in a direction through load 100 opposite to that when amplifiers A2 and A3 were conducting.

The actual direction of current passage through the load depends, of course, upon the type of amplifiers employed. If PNP transistors are employed, as are described below, the application of a negative signal to the base electrodes of the transistors acts as an effective gating control signal and causes current to pass in the emitter-to-collector path thereof and the application of a positive signal to the base electrodes effectively blocks the passage of such current.

Figure 2:
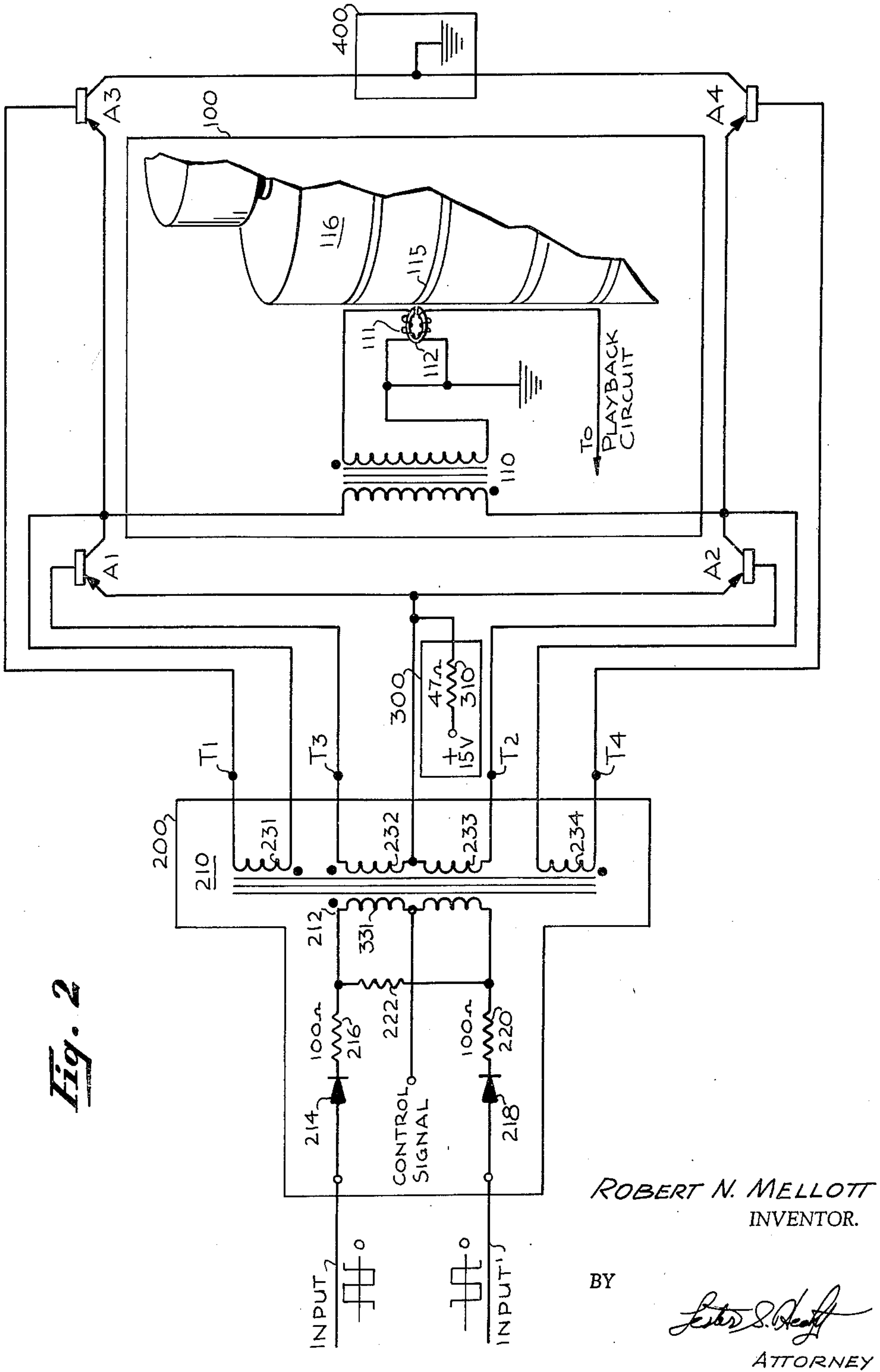
FIG. 2 is a schematic diagram of a circuit of the type shown in FIG. 1.

The specific operation of the invention can best be described by referring to a typical embodiment such as is shown in FIG. 2. As indicated therein, input circuit 200 comprises a transformer 210 having its primary section 212 coupled to an input network. The input network is arranged to pass digital input signals to the transformer primary in response to a control signal. In particular, it will be noted that complementary input signals are applied to diodes 214 and 218, and thence through input resistors 216 and 220 to opposite ends of primary winding 212. The center tap of primary winding 212 receives the control signal. A suitable input load resistor 222 is coupled across primary winding 212.

The control signal is selected so that diodes 214 and 218 are back biased when input signals are to be prevented from reaching transformer 210 and are forward biased when input signals are to be permitted to reach transformer 210. When the input signal is positive representing one digital value, diode 214 is forward biased provided the control signal level permits and diode 218 is back biased by the negative, complementary state of the complementary input signal represented as Input' in FIG. 2.

It will be noted that dots are shown at various points in association with the windings of transformer 210 to indicate the phase relationships of the respective voltages induced therein. The secondary section of transformer 210 includes four windings which will be referred to as first, second, third and fourth secondary windings designated by the reference numbers 231, 232, 233 and 234, respectively.

Load 100 of FIG. 1 appears in the form of an output transformer 110 in FIG. 2. This transformer has its primary winding connected with one end attached to the junction of the collector of transistor A1 and the emitter of transistor A3, both of the PNP type. The other end of the primary winding of transformer 110 is connected to the junction of the collector of transistor A2 and the emitter of transistor A4, also of the PNP type. The secondary winding of transformer 110 is connected across write winding 111 of a magnetic head 112 which is arranged to write on a channel 115 of a magnetic drum 116.

Source 300 will be noted to comprise a voltage of +15 volts and an impedance 310. Impedance 310 is coupled to the junction of the emitter electrodes of transistors A1 and A2. The collector electrodes of transistors A3 and A4 are coupled to ground. Terminals T1, T2, T3 and T4 correspond to those of FIG. 1 and are connected to the base electrodes of transistors A3, A2, A1 and A4, respectively.

With regard to operation, when the input signal is positive, terminals T1 and T2 are negative and terminals T3 and T4 are positive. Consequently, transistors A2 and A3 are biased to conduct in their emitter-to-collector paths, while transistors A1 and A4 are cut off. Thus, a current path is completed from supply 300, through transistor A2, upward through the primary winding of transformer 110, through transistor A3, to ground 400, and, as a consequence of the phasing shown for transformer 110, head 112 is energized by current in write winding 111 to record on channel 115 on drum 116 a magnetic binary signal which may be designated as a digit 1.

A path for passing current in the downward direction through the primary winding of transformer 110 is completed when the input signal is negative, terminals T3 and T4 are negative and terminals T1 and T2 are positive, and transistors A1 and A4 are forward biased. As a consequence, head 112 is energized to record a binary digit 0.

It will be understood, however, that the complementary input signal drive shown in FIG. 2 is not necessary for the practice of the invention. Diodes 214 and 218 may be eliminated and a continuous input signal application effected without a control signal. In this case a center-tapped primary winding 212 is not required and the positive and negative portions of the input signal are both effective to develop corresponding signals in the secondary windings of transformer 210.

Figure 3:
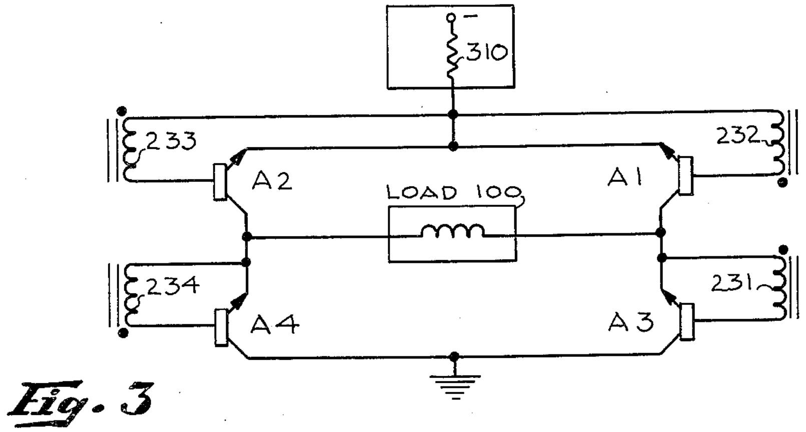
FIG. 3 illustrates in a partial schematic diagram the manner in which NPN transistors may be utilized to drive a load according to the invention.
Figure 4:
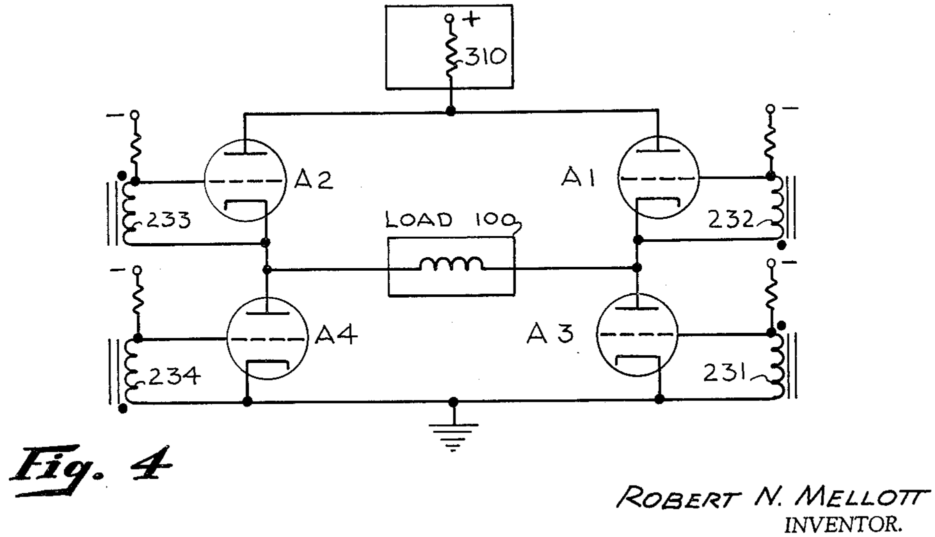
FIG. 4 illustrates in a partial schematic diagram the manner in which vacuum tubes may be employed to drive a load according to the invention.

The invention may be practiced as well with NPN transistors or vacuum tubes, as shown in FIGS. 3 and 4. These figures are arranged to indicate more clearly the manner in which secondary windings 231, 232, 233 and 234 of transformer 210 are connected to bias the amplifiers. It will be noted that these windings effectively cause the amplifiers to operate as a bridge circuit with load 100 being connected between two potential points which are either high or low depending upon the transistor conditions. When transistors A1 and A4 are driven into conduction due to the application of voltages to the base electrodes thereof which are relatively high compared to the emitter electrode voltages, current flows through load 100 to negative source 300. It is readily seen from FIG. 3 that the secondary windings are connected so that transistors A1 and A4 receive the same bias while transistors A2 and A3 receive an opposite bias so that when one pair of transistors is conducting the other pair is biased to cut off and vice versa.

The operation of the vacuum tube circuit shown in FIG. 4 should be apparent from the previous examples. In this case the grid voltages of tubes A1 and A4 are driven positive by secondary windings 232 and 234 while the grid voltages of tubes A2 and A3 are at cut off. Thus, current then flows in one direction through load 100. When the transformer input signal is changed in polarity, tubes A2 and A3 are driven into conduction and current then passes through load 100 in the opposite direction.

From the foregoing description, it should now be apparent that the present invention provides a novel load driving system where it is not necessary to employ an output transformer having a center tap. Furthermore, the invention is adapted for driving a load without the requirement of a transformer. Thus load 100 shown in FIGS. 3 and 4 may be the write winding 111 of magnetic head 112. It will be noted that the effective bridge arrangement insures that the voltages developed across the load are balanced since the same source is effective to develop the voltage, the only requirement being that the transistors have substantially equal impedances when forward biased.

What is claimed is:

1. A computer writing circuit for translating a pair of complementary binary input signals I and I′ into a magnetic flux having a direction corresponding to the binary representation of said input signals, signal I having first and second values representing the binary 1 and 0 condition of the input signal and signal I′ having said first and second values to represent the binary 0 and 1 condition of said input signal, said writing circuit comprising: an input transformer having first and second ends and an intermediate tap; first and second unilateral circuit elements for applying the first values of said input signals I and I′ to said first and second ends, respectively, of said input transformer; means for applying a bilevel control signal to said intermediate gap, said control signal levels being selected to backbias said unilateral elements for one level thereof to prevent passage of either of said input signal first values and having a second level which forward biases said unilateral elements to permit passage of either of said first values; said input transformer further including an output winding for producing first, second, third and fourth gating signals; and a gating circuit including four transistors for producing an output signal having a sense, when present, corresponding to the binary representation of said input signals, the output signal having a 0 or neutral representing sense when said control signal prevents passage of said first values to said first and second ends of said input transformer, each of said transistors being controlled by an associated one of said gating signals such that two transistors are operative under one input signal condition to produce an output signal representing binary 1 in flux control, and the other two transistors are operative under the other input signal condition to produce an output signal representing binary 0 in flux control.

2. A magnetic drum writing circuit comprising: first and second pairs of amplifier gates for controlling the passage of bidirectional flux through a magnetic head, one pair of said gates being arranged to pass flux causing current through the head in one direction and the other pair of gates being arranged to pass flux causing current through said head in a second direction opposite to said one direction; an input transformer having primary and secondary windings; said primary winding having first and second ends and a center tap; a first unilateral device coupled to said first end and arranged to pass current through one part of said primary winding to said center tap; a second unilateral device coupled to said second end and arranged to pass current through the other part of said primary winding; means for applying a control signal to said center tap to permit back biasing of said unilateral devices to prevent writing through said head; and means coupling the secondary windings of said input transformer to said gates to control the passage of flux current through said head so that current therethrough may be completely inhibited by said control signal or caused to pass therethrough in response to an input signal of a predetermined polarity applied to either of said unilateral devices, the direction of said current passage being controlled by selection of unilateral devices, the application of an input signal to said first unilateral device causing current and flux in one direction and the application of the input signal to the second unilateral device causing current and flux in a direction opposite to said one direction.

3. An input circuit for a magnetic head driving system, said input circuit comprising: four gates, two of said gates being arranged to pass flux through said head in one direction, and the other two of said gates being arranged to pass flux through said head in the opposite direction to said one direction; first and second diodes for receiving input signals I and I′, respectively, representing a binary digit, signals I and I′ being selected to tend to forward bias said diodes, respectively, when the particular signal represents binary 1, each of said signals having a complementary state back biasing the respective diode when the particular signal represents binary 0; a transformer having a primary with first and second ends and an intermediate tap, and first, second, third and fourth secondary windings; means for applying a bilevel control signal to said intermediate tap, said control signal having a level selected to back bias said diodes, and a second level to permit forward biasing of said diodes by the respective signal I and I′; means for applying the first and second ends of said primary winding to said first and second diodes, respectively; and means coupling said four secondary windings to said four gates, respectively, to control the flux direction through said head such that the binary 1 representing state of signal I associated with the binary 0 representing state of signal I′ causes flux to pass through said head in one direction for the forward biasing condition of said control signal, and the binary 0 representing state of signal I associated with the binary 1 representing state of signal I′ causes flux to pass through said head in the opposite direction to said one direction for the forward biasing condition of said control signal, no flux being passed when said control signal back biases said diodes.

References Cited in the file of this patent

UNITED STATES PATENTS

| | | |
|---|---|---|
| 2,821,639 | Bright et al. | Jan. 28, 1958 |
| 2,838,675 | Wanless | June 10, 1958 |
| 2,872,582 | Norton | Feb. 3, 1959 |